United States Patent
Dussillols et al.

(10) Patent No.: US 7,784,270 B2
(45) Date of Patent: Aug. 31, 2010

(54) ROTARY MOTION MIXER FOR A CONVERGING-STREAM NOZZLE OF A TURBOMACHINE

(75) Inventors: Laurent Christophe Dussillols, Melun (FR); Alexandre Alfred Gaston Vuillemin, Paris (FR)

(73) Assignee: SNECMA, Paris (FR)

( * ) Notice: Subject to any disclaimer, the term of this patent is extended or adjusted under 35 U.S.C. 154(b) by 691 days.

(21) Appl. No.: 11/764,627

(22) Filed: Jun. 18, 2007

(65) Prior Publication Data

US 2008/0105488 A1    May 8, 2008

(30) Foreign Application Priority Data

Jun. 19, 2006    (FR) .................................. 06 52535

(51) Int. Cl.
*F02K 1/48* (2006.01)
*F02K 1/40* (2006.01)
(52) U.S. Cl. ...................... 60/262; 60/264; 239/265.19; 181/220
(58) Field of Classification Search ................ 60/226.1, 60/262, 264; 239/265.17, 265.19; 181/213, 181/220
See application file for complete search history.

(56) References Cited

U.S. PATENT DOCUMENTS

| | | | |
|---|---|---|---|
| 4,577,462 A * | 3/1986 | Robertson | .................... 60/262 |
| 6,012,281 A * | 1/2000 | Hauser | .................... 60/262 |
| 6,412,283 B1 | 7/2002 | Sheoran et al. | |
| 6,606,854 B1 * | 8/2003 | Siefker et al. | .................. 60/262 |
| 7,310,939 B2 * | 12/2007 | Prouteau et al. | ................ 60/262 |
| 2006/0112675 A1 * | 6/2006 | Anderson et al. | ............. 60/262 |

FOREIGN PATENT DOCUMENTS

| | | |
|---|---|---|
| GB | 1045295 | 10/1966 |
| WO | WO 94/18446 | 8/1994 |
| WO | WO 03/050403 A1 | 6/2003 |

\* cited by examiner

*Primary Examiner*—Ted Kim
(74) *Attorney, Agent, or Firm*—Oblon, Spivak, McClelland, Maier & Neustadt, L.L.P.

(57) ABSTRACT

The invention relates to a mixer for a bypass turbomachine, the mixer comprising a member having a sinusoidal portion at its end defining inner lobes and outer lobes, each outer lobe comprising a pair of plane radial walls spaced apart from each other in the circumferential direction and interconnected by an outer dome, each inner lobe comprising a pair of plane radial walls spaced apart from each other in the circumferential direction and connected together by an inner dome, the walls of the outer lobes being disposed to extend the walls of the inner lobes radially, the radial walls of a given outer lobe extending radially in mutually parallel directions, with these walls, when extended geometrically, defining a zone from which the axis of symmetry of the cylindrical member is excluded.

5 Claims, 2 Drawing Sheets

ROTARY MOTION MIXER FOR A CONVERGING-STREAM NOZZLE OF A TURBOMACHINE

BACKGROUND OF THE INVENTION

The present invention relates to the general field of mixers for mixing concentric gas streams from a bypass turbomachine. The invention relates more particularly to a mixer of the daisy type for a converging-stream nozzle.

Sound pollution is nowadays one of the major concerns of engine manufacturers who are receiving more and more objections to the sound nuisance of their turbomachines. The sources of noise in a turbomachine are numerous, but that it has been found that the noise of the jet leaving the nozzle is the predominant noise during airplane takeoff. Certification authorities are becoming more and more strict in terms of noise emission from turbomachines, and manufacturers have been requested to make efforts to reduce the noise that turbomachines generate, and in particular the jet noise at the outlet from the nozzle.

Typically, a converging-stream nozzle of a turbomachine comprises a primary cover centered on the longitudinal axis of the turbomachine, a secondary cover disposed concentrically around the primary cover so as to define a first annular channel along which an outer stream (or cool stream) flows, and a central body disposed concentrically inside the primary cover so as to define a second annular channel along which an inner stream (or hot stream) flows, with the secondary cover extending beyond the primary cover.

Generally, a converging-stream nozzle also includes a mixer mounted at the downstream end of the primary cover. Such a mixer is designed to reduce jet noise at the outlet from the nozzle by forcing mixing to take place between the cool stream and the hot stream prior to their ejection. It is well known that such reductions in noise are obtained by increasing the degree of mixing between the cool stream and the hot stream coming from the turbomachine.

Amongst mixers for converging-stream nozzles, one particular known type of mixer is of the daisy type that is in the form of a substantially sinusoidal portion defining inner lobes and outer lobes distributed around the circumference of the primary cover of the nozzle. Reference can be made for example to U.S. Pat. Nos. 4,077,206 and 4,117,671.

With such a daisy type mixer, the inner lobes form gutters guiding the cool stream radially towards the second channel in which the hot stream flows, and the outer lobes form other gutters guiding the hot stream radially towards the first channel in which the cool stream flows. Thus, at the outlet from the mixer, the cool and hot streams mix in shear in a direction that is substantially radial. This mixing enables turbulence to be generated presenting an axis of rotation that is generally axial and of a magnitude that depends mainly on the stream ejection conditions (turbomachine bypass ratio, shear between the cool and hot streams) and on the conditions with which the bottoms of the lobes of the mixer are fed.

Unfortunately, when the ejection conditions of the streams and the feeding of the bottoms of the lobes are not optimized, the magnitude of the turbulence generated by a daisy type mixer is not sufficient for obtaining really effective mixing between the cool stream and the hot stream, thus limiting the extent to which the jet noise levels can be reduced during airplane takeoff.

OBJECT AND SUMMARY OF THE INVENTION

A main object of the present invention is thus to mitigate such drawbacks by proposing a daisy-petal type mixer that enables mixing between the cool stream and the hot stream to be improved so as to reduce the noise nuisance of the turbomachine.

This object is achieved by a mixer for mixing inner and outer concentric gas streams in a bypass turbomachine, the mixer comprising a substantially cylindrical member having a substantially sinusoidal portion at its downstream end defining inner lobes and outer lobes distributed around its circumference, each outer lobe having a pair of substantially plane radial walls that are spaced apart from each other in the circumferential direction and that are connected together by an outer curvilinear dome so as to form an outer gutter guiding the inner gas stream radially outwards, each inner lobe comprising a pair of substantially plane radial walls that are spaced apart from each other in the circumferential direction and that are interconnected by an inner curvilinear dome so as to form an inner gutter guiding the outer gas stream radially inwards, the walls of the outer lobes being disposed to extend radially the walls of the inner lobes, in which, in accordance with the invention, the radial walls of a given outer lobe extend radially in directions that are substantially mutually parallel, with these walls when extended defining a zone from which the axis of symmetry of the cylindrical member is excluded.

By means of such a disposition of the radial walls of the inner lobes, the gas streams traveling along the inner gutters and those traveling along the outer gutters have rotary motion imparted thereto about the axis of symmetry of the cylindrical member at its outlet. Such rotary motion has the consequence of increasing the shear effects between the cool stream and the hot stream by adding an azimuth component to the mixing between these two streams. This encourages mixing between the cool stream and the hot stream, thereby improving the performance of the nozzle under cruising conditions.

From a noise point of view, adding this azimuth component to the mixing enables the jet noise at low frequencies to be diminished without thereby increasing noise levels at high frequencies.

Preferably, the radial walls of a given inner lobe extend radially in directions that converge on a point that is not situated on the axis of revolution of the cylindrical member.

In an embodiment of the invention, the radial walls of all of the inner lobes extend radially along directions that all converge on a common circle centered on the axis of symmetry of the cylindrical member, concentrically thereabout. This embodiment corresponds to having the same angle of gyration for all of the lobes of the mixer.

The invention also provides a turbomachine converging-stream nozzle that includes a mixer as defined above.

The invention also provides a turbomachine including a converging-stream nozzle fitted with a mixer as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
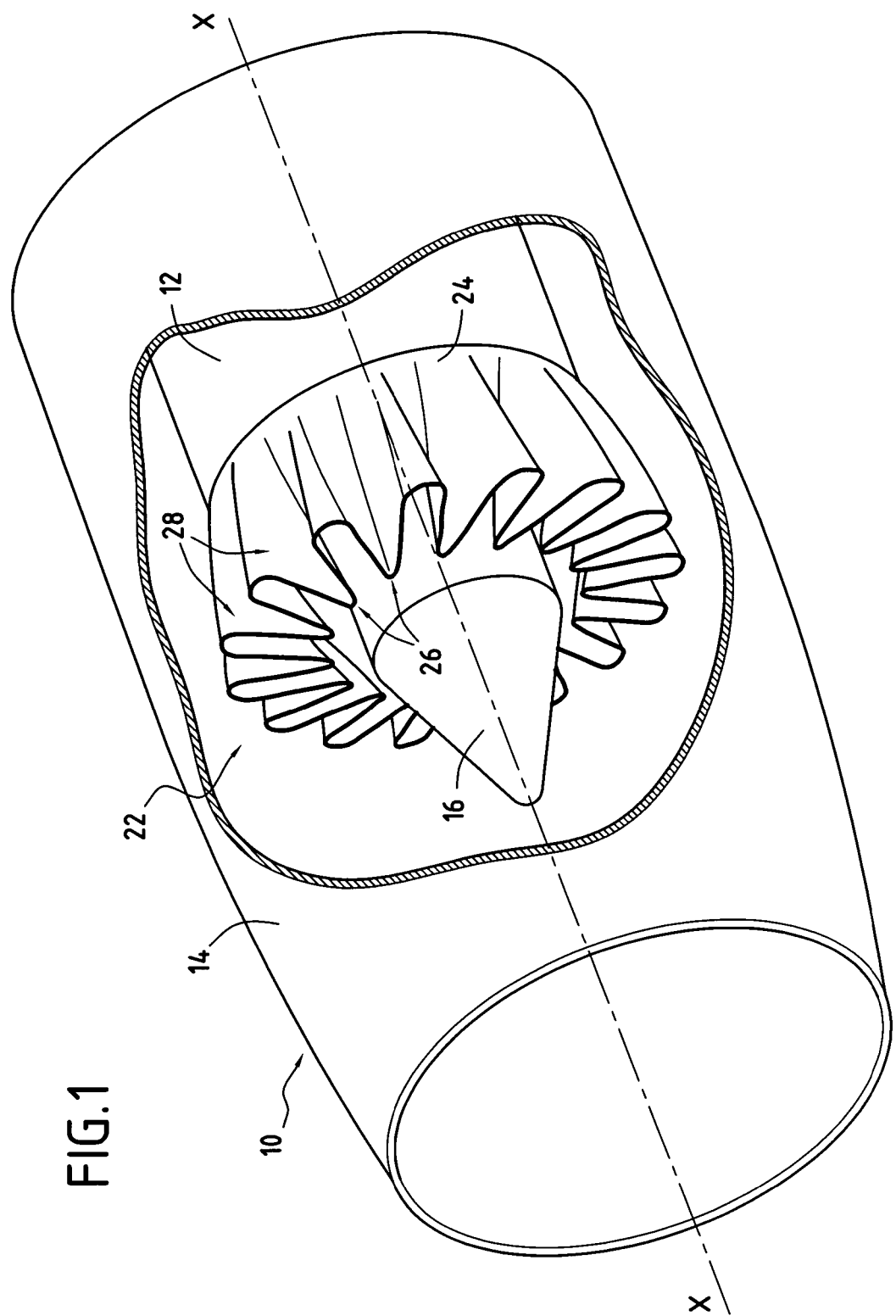
FIG. 1 is a diagrammatic cutaway perspective view of a nozzle having converging streams fitted with a mixer of the invention.

FIG. 1 is a cutaway diagrammatic perspective view of a nozzle 10 having converging streams in a bypass turbomachine.

The nozzle 10 is axially symmetrical in shape about its longitudinal axis X-X and is typically formed by a primary cover 12, a secondary cover 14, and a central body 16 all centered on the longitudinal axis X-X of the nozzle.

The primary cover 12 of substantially cylindrical shape extends along the longitudinal axis X-X of the nozzle. The central body 16 is disposed concentrically inside the primary cover and is terminated by a substantially conical portion.

The secondary cover 14, also substantially cylindrical in shape, surrounds the primary cover 12, being concentric thereabout and likewise extending along the longitudinal axis X-X of the nozzle. The secondary cover 14 extends longitudinally downstream beyond the primary cover 12.

It should be observed that in the embodiment shown in FIG. 1, the central body 16 of the nozzle 10 is of the external type, i.e. the central body extends longitudinally beyond the trailing edge of the primary cover 12.

Nevertheless, the invention can also apply to a nozzle for converging streams of the internal type in which the trailing edge of the primary cover extends longitudinally between the central body so as to cover it completely.

In the description below, the terms "inner" and "outer" designate an element of the mixer or of the nozzle that is respectively close to or far from the longitudinal axis X-X of the nozzle.

Figure 2:
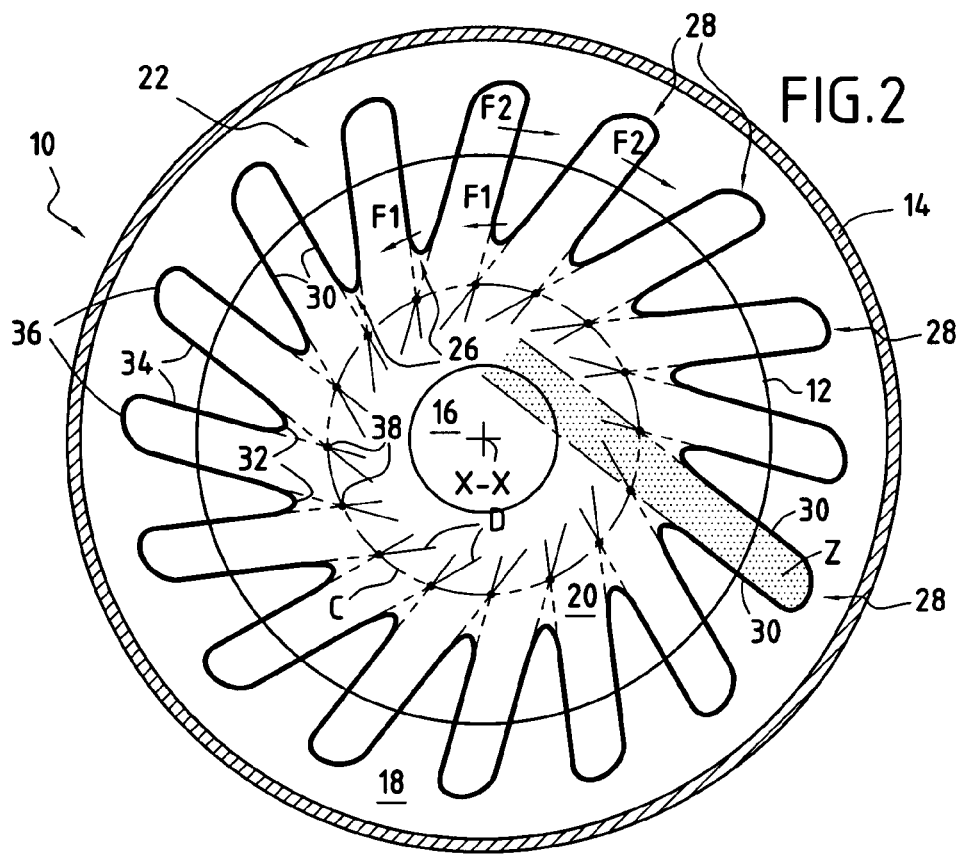
FIG. 2 is a fragmentary section view of the FIG. 1 mixer on a radial plane perpendicular to the longitudinal axis of the nozzle.

As shown in FIG. 2, the concentric assembly of the elements of the nozzle 10 serves to define firstly a first annular channel 18 between the primary and secondary covers 12 and 14 for passing an outer stream of gas coming from the turbomachine and referred to as the bypass stream or the cool stream, and secondly between the primary cover 12 and the central body 16, a second annular channel 20 for passing an inner stream of gas coming from the turbomachine and referred to as the main stream or hot stream.

The main and bypass streams traveling along these two annular channels 18 and 20 mix together in a mixer 22 located at the downstream end of the primary cover 12.

The mixer 22 of the invention is of the daisy type. It comprises a member 24 that is substantially cylindrical about the axis X-X with its downstream end presenting a substantially sinusoidal portion defining inner lobes 26 and outer lobes 28.

The inner and outer lobes 26 and 28 of the mixer alternate with one another and are regularly distributed around the entire circumference of the cylindrical member 24.

As shown in FIG. 2, the inner lobes 26 project radially towards the inside of the primary cover 12, i.e. they penetrate into the second channel 20 for passing the hot stream, while the outer lobes 28 project radially outwards from the primary cover 12, i.e. they penetrate into the first channel 18 for passing the cool stream.

Furthermore, as shown in FIG. 1, the lobes 26 and 28 of the mixer all extend over the same distance along the longitudinal axis X-X of the nozzle. Nevertheless, the invention also applies to mixers in which the lobes present different lengths in the longitudinal direction.

More precisely, each of the inner lobes 26 is formed by a pair of substantially plane walls 30 extending in directions that are substantially radial, which walls are spaced apart from one another in the circumferential direction and are interconnected at their inner ends by an inner curvilinear dome (or arch) 32.

Similarly, each of the outer lobes 28 is formed by a pair of walls 34 that are substantially plane, extending in substantially radial directions, which walls are spaced apart from one another in the circumferential direction and are connected to one another towards the outside by an outer curvilinear dome 36.

It should be observed that the radial walls 34 of a given outer lobe 28 extend radially in line with the radial walls 30 of two directly adjacent inner lobes 26 (and vice versa).

Thus, each inner lobe 26 forms an inner gutter (or trough) serving to guide the cool stream traveling in the first channel 18 of the nozzle to flow inwards, i.e. the cool stream traveling along said inner gutters is directed radially towards the longitudinal axis X-X of the nozzle to be mixed with the hot stream traveling along the second channel 20 of the nozzle.

Similarly, each outer lobe 28 forms an outer gutter (or trough) whereby the hot stream traveling in the second channel 20 of the nozzle is guided to flow radially outwards, i.e. the hot stream traveling along such outer gutters is directed towards the first channel 18 of the nozzle to become mixed with the cool stream traveling therein.

As a result, mixing takes place between the cool stream traveling along the first channel 18 of the nozzle and the hot stream traveling along the second channel 20. This mixing, which serves in particular to reduce the jet noise from the nozzle, takes place in a direction that is generally radial. This is due to the particular shape of the mixer with its lobes that penetrate radially into the respective flow channels for the cold and hot streams.

According to the invention, the radial walls 34 of a given outer lobe 28 are substantially parallel to each other and when extended these walls define a zone Z from which the longitudinal axis X-X of the nozzle is excluded (this axis coinciding with the axis of circular symmetry of the cylindrical member 24).

In other words, the two radial walls 34 of a given outer lobe 28 extend in two parallel directions, these two directions defining between them a zone Z that does not intersect the longitudinal axis X-X of the nozzle (the axis X-X does not belong to the zone Z). In the example of FIG. 2, part of the zone Z is shown in stipple shading for one of the outer lobes 28.

The radial walls 30 of a given inner lobe 26 preferably extend radially along directions D that converge at a point 38 that is not situated on the longitudinal axis X-X of the nozzle.

Figure 3:
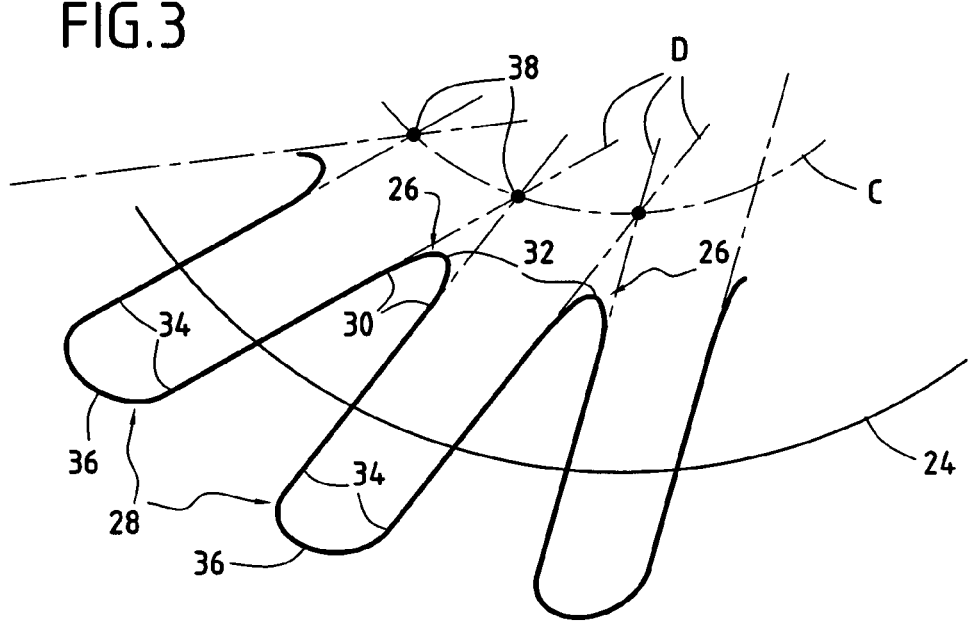
FIG. 3 is an enlarged view of the lobes of the mixer in the section view of FIG. 2.

Thus, as shown in FIGS. 2 and 3, if consideration is given to one of the outer lobes 28 of the mixer, it can clearly be seen that the two radial walls 34 that constitute it extend radially in mutually parallel directions (they do not converge).

Similarly, for a given inner lobe 26, the two radial walls 30 that constitute it extend along two directions D that converge in a radial plane perpendicular to the longitudinal axis X-X of the nozzle, but on a point 38 that is not situated on said longitudinal axis X-X. In other words, the line corresponding to the intersection between two planes in which the two radial walls 24 of a given inner lobe 26 lie is distinct from the longitudinal axis X-X of the nozzle.

Such a disposition of the radial walls of the lobes of the mixer corresponds to giving these lobes an azimuth component (the lobes are said to be "twisted" about the longitudinal axis of the nozzle). This means that when the air traveling along the gutters formed by these lobes leaves the mixer, it has rotary motion imparted thereto about the longitudinal axis of the nozzle.

In the embodiment shown in FIGS. 2 and 3, for the mixer 22 as a whole, all of the points 38 of convergence of the directions D along which the radial walls 34 of the inner lobes 26 converge are themselves situated in a radial plane perpendicular to the longitudinal axis X-X of the nozzle, on a common geometrical circle C. The circle C is centered on the axis of symmetry of the cylindrical member 24 and it is concentric therewith.

This embodiment corresponds to an angle of gyration that is substantially identical for all of the lobes of the mixer 22. As shown in FIG. 2, it can be observed that the diameter of the convergent circle C can be greater than the diameter of the central body 16 of the nozzle. Alternatively, it could be less than or equal thereto. It should also be observed that the greater the diameter of the circle C, the greater the amount of rotary motion imparted to the flow of the gas streams.

The rotary motion imparted by the profile of the radial walls of the lobes serves to create mixing in a direction that is substantially circumferential between the hot steam and the cool steam.

The cool stream flowing along the first channel 18 of the nozzle is guided mainly in an outward radial direction on following one of the inner lobes 26, and at the downstream end thereof, a portion of this stream is directed in a circumferential direction F1 into the hot stream. In the embodiment of FIG. 2, this circumferential direction F1 is directed in a counterclockwise direction.

Similarly, the hot stream flowing along the second channel 18 of the nozzle is guided mainly in a radial outward direction on taking an outer lobe 28, and at the downstream end thereof, a portion of this stream is directed in a circumferential direction F2 into the cool stream. This circumferential direction F2 is opposite to the circumferential direction F1, i.e. in the embodiment shown in FIG. 2, it is directed clockwise.

As a result, the main shear between the cool and hot streams that occurs in a direction that is substantially radial, has associated therewith an additional or secondary shear between these two streams that occurs in a circumferential direction and serves to intensify the mixing between the streams, and consequently serves to improve the acoustic efficiency of the device.

As mentioned above, it should be observed that the greater the diameter of the geometrical convergence circle C of the directions D along which the radial walls 34 of the inner lobes 26 extend, the greater the amount of rotary motion that is imparted to the flow of the gas streams.

What is claimed is:

1. A mixer for mixing inner and outer concentric gas streams in a bypass turbomachine, the mixer comprising a substantially cylindrical member having a substantially sinusoidal portion at its downstream end defining inner lobes and outer lobes distributed around its circumference, each outer lobe having a pair of substantially plane radial walls that are spaced apart from each other in the circumferential direction and that are connected together by an outer curvilinear dome so as to form an outer gutter guiding the inner gas stream radially outwards, each inner lobe comprising a pair of substantially plane radial walls that are spaced apart from each other in the circumferential direction and that are interconnected by an inner curvilinear dome so as to form an inner gutter guiding the outer gas stream radially inwards, the walls of the outer lobes being disposed to extend radially the walls of the inner lobes, wherein the radial walls of a given outer lobe extend radially in directions that are substantially mutually parallel, with these walls when extended defining a zone from which the axis of symmetry of the cylindrical member is excluded.

2. A mixer according to claim 1, in which the radial walls of a given inner lobe extend radially in directions that converge on a point that is not situated on the axis of revolution of the cylindrical member.

3. A mixer according to claim 2, in which the radial walls of all of the inner lobes extend radially along directions that all converge on a common circle centered on the axis of symmetry of the cylindrical member, concentrically thereabout.

4. A converging-stream nozzle for a turbomachine, the nozzle including a mixer according to claim 1.

5. A turbomachine including a converging-stream nozzle fitted with a mixer according to claim 1.

* * * * *